(12) United States Patent
Takizawa

(10) Patent No.: US 8,421,309 B2
(45) Date of Patent: Apr. 16, 2013

(54) ULTRASONIC MOTOR

(75) Inventor: Hiroyuki Takizawa, Chofu (JP)

(73) Assignee: Olympus Corporation, Tokyo (JP)

( * ) Notice: Subject to any disclaimer, the term of this patent is extended or adjusted under 35 U.S.C. 154(b) by 89 days.

(21) Appl. No.: 13/194,354

(22) Filed: Jul. 29, 2011

(65) Prior Publication Data

US 2012/0032558 A1 Feb. 9, 2012

(30) Foreign Application Priority Data

Aug. 4, 2010 (JP) ................................. 2010-175242

(51) Int. Cl.
*H01L 41/08* (2006.01)

(52) U.S. Cl.
USPC ............. 310/323.02; 310/323.12; 310/323.16

(58) Field of Classification Search ............. 310/323.02, 310/323.12, 323.16
See application file for complete search history.

(56) References Cited

U.S. PATENT DOCUMENTS

| | | | | |
|---|---|---|---|---|
| 5,723,935 | A * | 3/1998 | Tomikawa et al. | 310/323.02 |
| 6,252,332 | B1 * | 6/2001 | Takagi et al. | 310/323.02 |
| 6,469,419 | B2 * | 10/2002 | Kato et al. | 310/323.02 |
| 8,294,334 | B2 * | 10/2012 | Takizawa et al. | 310/323.02 |
| 8,294,335 | B2 * | 10/2012 | Takizawa | 310/323.16 |
| 8,299,682 | B2 * | 10/2012 | Takizawa | 310/323.02 |
| 8,299,683 | B2 * | 10/2012 | Takizawa | 310/323.12 |
| 8,304,962 | B2 * | 11/2012 | Matsui | 310/323.02 |

FOREIGN PATENT DOCUMENTS

JP 09-117168 5/1997

* cited by examiner

*Primary Examiner* — Mark Budd
(74) *Attorney, Agent, or Firm* — Scully Scott Murphy & Presser, PC

(57) ABSTRACT

In an ultrasonic motor, an elliptical vibration is generated by combining a longitudinal primary resonance vibration, resulting from an expansion and a contraction of a vibrator in a direction of a central axis, and a torsional secondary resonance vibration or a torsional tertiary resonance vibration resulting from twisting of the vibrator about the central axis. A dimension ratio of a rectangle of the vibrator is chosen such that a resonance frequency of the longitudinal primary resonance vibration, resulting from the expansion and the contraction of the vibrator in the direction of the central axis, and a resonance frequency of the torsional secondary resonance vibration or the torsional tertiary resonance vibration, resulting from twisting of the vibrator about rotation axis, substantially match. The vibrator includes, stacked in a short side direction of the cross-section, at least one torsional piezoelectric body that generates the torsional secondary resonance vibration or the torsional tertiary resonance vibration, and a piezoelectric body for longitudinal vibration that generates at least the longitudinal primary resonance vibration.

8 Claims, 20 Drawing Sheets

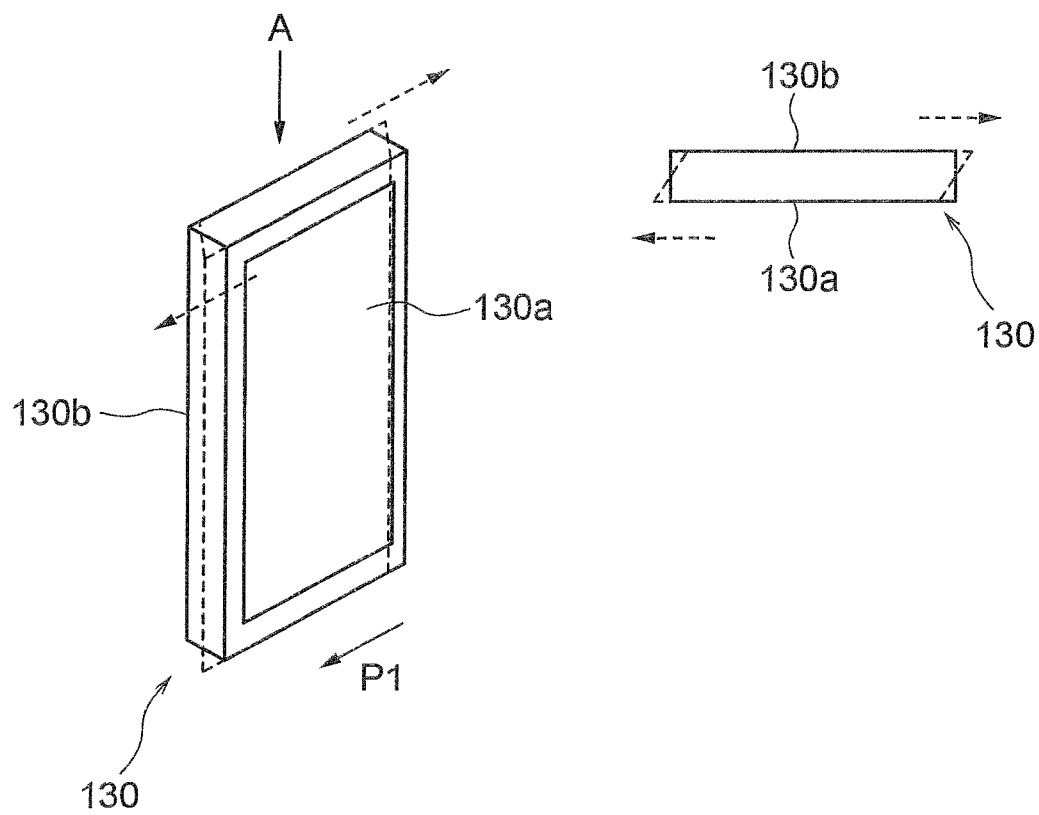

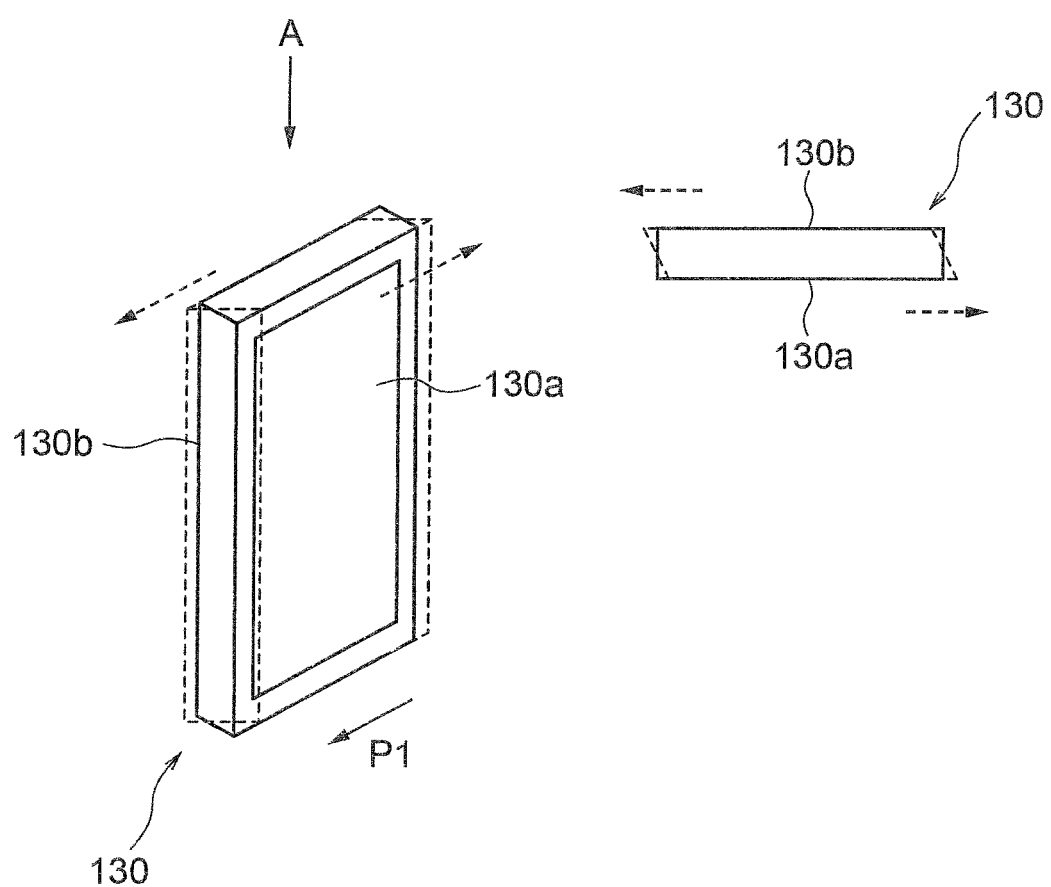

FIG.8A
FIG.8B
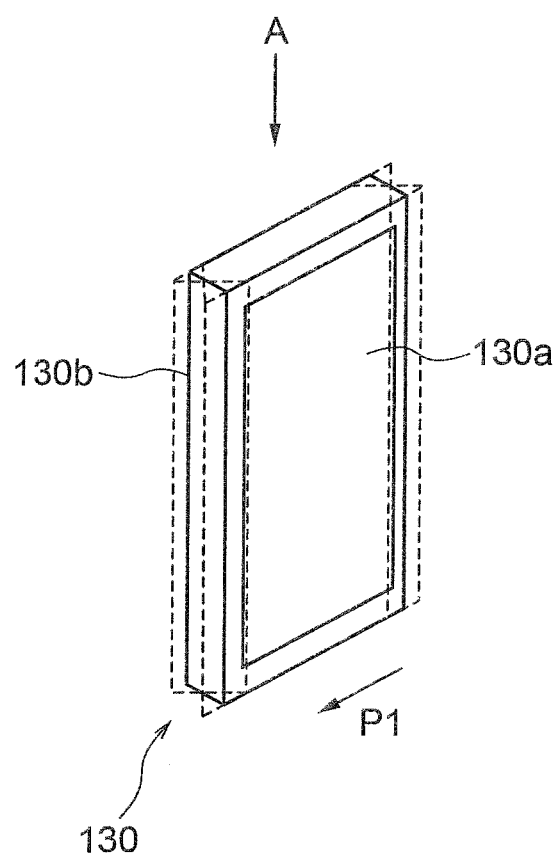
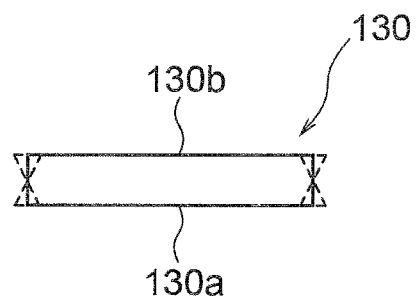

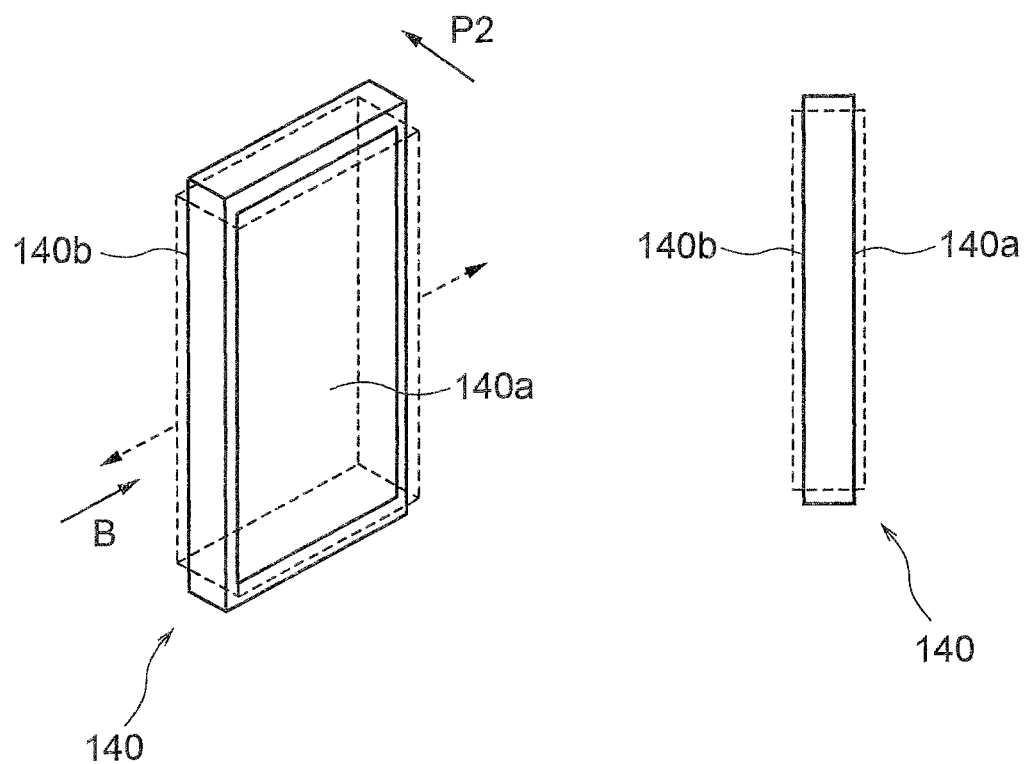

ULTRASONIC MOTOR

CROSS-REFERENCE TO RELATED APPLICATIONS

The present application is based upon and claims the benefit of priority from the prior Japanese Patent Application No. 2010-175242 filed on Aug. 4, 2010; the entire contents of which are incorporated herein by reference.

BACKGROUND OF THE INVENTION

1. Field of the Invention

The present invention relates to an ultrasonic motor.

2. Description of the Related Art

Japanese Patent Application Laid-open No. Hei9-117168, for example, discloses an ultrasonic motor that generates an elliptical vibration by combining a longitudinal vibration and a torsional vibration, and rotation drives a rotor based on the generated elliptical vibration. FIG. 1 of Japanese Patent Application Laid-open No. Hei9-117168 depicts an exploded perspective view of a vibrator. The vibrator has a structure in which a plurality of piezoelectric elements is arranged between elastic bodies that are cut obliquely with respect to an axis of the vibrator. Positive electrodes of the piezoelectric elements are divided into two groups. These groups will be called Phase A and Phase B electrodes in the current specification.

The longitudinal vibration can be generated in a bar-shaped vibrator by applying alternating voltages of the same phase to both Phase A and Phase B electrodes. On the other hand, the torsional vibration can be generated in the bar-shaped vibrator by applying alternating voltages of opposite phases to both Phase A and Phase B electrodes. A position of a groove in the vibrator is adjusted such that a resonance frequency of the longitudinal vibration and a resonance frequency of the torsional vibration substantially match. When alternating voltages that differ by $\pi/2$ phase are applied to Phase A and Phase B electrodes, the longitudinal vibration and the torsional vibration are generated simultaneously, thereby generating an elliptical vibration on a top surface of a bar-shaped elastic body. In this state, by pressing the rotor on the top surface of the bar-shaped elastic body, the rotor can be rotated in a clockwise direction (CW direction) or a counter-clockwise direction (COW direction).

The ultrasonic motor disclosed in Japanese Patent Application Laid-open No. Hei9-117168 has various drawbacks. For example, as shown in FIG. 1 of that application, both the piezoelectric element and the elastic body are necessary, the elastic body must be cut obliquely, and the groove must be made in a portion of the elastic body to match the resonance frequencies of the longitudinal vibration and the torsional vibration. Thus, in the ultrasonic motor, the overall structure of the conventional vibrator is very complicated and an efficiency of generation of a torsional resonance vibration is low.

SUMMARY OF THE INVENTION

The present invention is made in view of the above discussion, and it is an object of the present invention to provide an ultrasonic motor that can generate a torsional resonance vibration efficiently by positively applying a shear vibration of a piezoelectric element. Moreover, the ultrasonic motor according to the present invention includes a single part, has a simple structure without a groove etc., can generate a longitudinal vibration and a torsional vibration easily, can generate an elliptical vibration by combining the longitudinal vibration and the torsional vibration, and can rotate a rotor by the elliptical vibration.

To solve the above problems and to achieve the above objects, according to an aspect of the present invention, an ultrasonic motor includes a vibrator having a dimension ratio of a rectangle in a cross-section orthogonal to a central axis; and a rotor that is in contact with an elliptical vibration generating surface of the vibrator and that is rotated around the central axis, which is orthogonal to the elliptical vibration generating surface of the vibrator. An elliptical vibration is generated by combining a longitudinal primary resonance vibration, resulting from an expansion and a contraction of the vibrator in a direction of the central axis, and a torsional secondary resonance vibration or a torsional tertiary resonance vibration, resulting from twisting of a central axis. The dimension ratio of the rectangle of the vibrator is chosen such that a resonance frequency of the longitudinal primary resonance vibration and a resonance frequency of the torsional secondary resonance vibration or the torsional tertiary resonance vibration match. The vibrator includes at least one torsional piezoelectric body that generates the torsional secondary resonance vibration or the torsional tertiary resonance vibration, and a piezoelectric body for longitudinal vibration that generates at least the longitudinal primary resonance vibration.

In the ultrasonic motor according to the present invention, it is preferable that an electrode that generates in the torsional piezoelectric body the torsional secondary resonance vibration or the torsional tertiary resonance vibration be arranged at an anti-node position of the torsional secondary resonance vibration or the torsional tertiary resonance vibration.

In the ultrasonic motor according to the present invention, it is preferable that a polarization direction of the torsional piezoelectric body is orthogonal to the central axis of the rotor and a signal application direction towards driving electrodes.

In the ultrasonic motor according to the present invention, it is preferable that one torsional piezoelectric body and one piezoelectric body for longitudinal vibration be stacked in a short side direction of a cross-section.

In the ultrasonic motor according to the present invention, it is preferable that the vibrator includes one piezoelectric body for longitudinal vibration sandwiched between two torsional piezoelectric bodies.

BRIEF DESCRIPTION OF THE DRAWINGS

FIG. 6A is a perspective view depicting a thickness shear vibration when a drive signal is applied to the piezoelectric element for torsional vibration according to the first embodiment, and FIG. 6B is a plan view of FIG. 6A;

FIG. 7A is a perspective view depicting a thickness shear vibration when a drive signal in a direction opposite to the direction of the case shown in FIGS. 6A and 6B is applied to the piezoelectric element for torsional vibration according to the first embodiment, and FIG. 7B is a plan view of FIG. 7A;

FIG. 8A is a perspective view depicting a thickness shear vibration when an alternating electric field is applied to the piezoelectric element for torsional vibration according to the first embodiment, and FIG. 8B is a plan view of FIG. 8A.

FIG. 11A is a perspective view from an upper front right side depicting a longitudinal vibration when the drive signal in a direction opposite to the direction of the case shown in FIGS. 9A and 9B is applied to the piezoelectric element for longitudinal vibration, and FIG. 11B is a right side view of FIG. 11A;

DETAILED DESCRIPTION OF THE INVENTION

Exemplary embodiments of an ultrasonic motor according to the present invention are explained in detail below referring to the accompanying drawings. The present invention is not limited to the following embodiments.

First Embodiment

Figure 1:
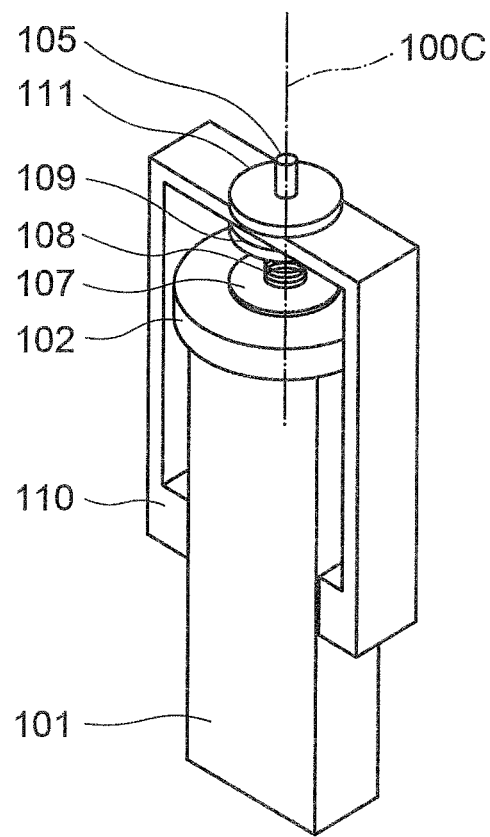
FIG. 1 is a perspective view of a structure of an ultrasonic motor according to a first embodiment of the present invention.
Figure 2:
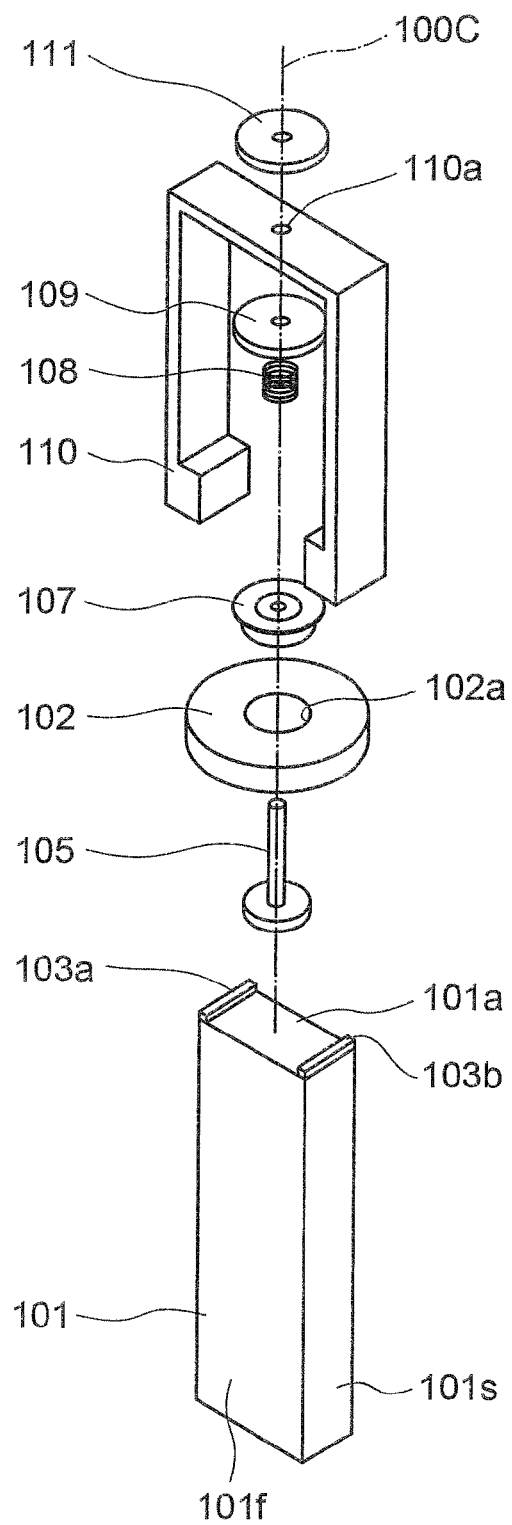
FIG. 2 is an exploded perspective view of the structure of the ultrasonic motor according to the first embodiment of the present invention.

An ultrasonic motor 100 according to the first embodiment of the present invention generates an elliptical vibration by combining a longitudinal primary resonance vibration and a torsional secondary resonance vibration. As shown in FIGS. 1 and 2, the ultrasonic motor 100 includes a vibrator 101 and a rotor 102.

The vibrator 101 is a piezoelectric element of a substantially right-angled parallelepiped shape having a dimension ratio of a rectangle in a cross-section orthogonal to its central axis 100C (rotation axis). The rotor 102 is substantially disk-shaped. A bottom surface of the rotor 102 contacts with friction contact members 103a and 103b that are arranged on an elliptical vibration generating surface 101a of the vibrator 101. The rotor 102 is rotated around the central axis 100C that is orthogonal to the elliptical vibration generating surface 101a of the vibrator 101.

A structure for coupling the rotor 102 to the vibrator 101 is explained below.

A holder 110 is fixed near a node of the vibrator 101 (piezoelectric element) A shaft 105, the rotor 102, a bearing 107, a press spring 108, and a spring holding ring 109 are arranged in this order between the elliptical vibration generating surface 101a of the vibrator 101 and the holder 110. All these members are concentrically arranged on the central axis 100C.

The bearing 107 is engaged with a central hole 102a of the rotor 102. The shaft 105 passes through the central hole 102a of the rotor 102 and a hole of the bearing 107 along the central axis 100C. A base of the shaft 105 rests on the elliptical vibration generating surface 101a of the vibrator 101.

The shaft 105, which penetrates the central hole 102a of the rotor 102 and the hole of the bearing 107, passes through the press spring 108 and a hole of the spring holding ring 109 in this order, and then passes through a through hole 110a provided in an upper part of the holder 110. A ring 111 is threadably mounted on an upper tip of the shaft 105 that comes out of the through hole 110a. The shaft 105 is thus fixed to the holder 110.

The spring holding ring 109 and the shaft 105 are provided with threads, and the spring holding ring 109 is threadably mounted on the shaft 105. A position of the spring holding ring 109 on the shaft 105, i.e., a pressing force of the press spring 108, can be adjusted by rotating the spring holding ring 109. In other words, a force by which the rotor 102 presses the friction contact members 103a and 103b can be adjusted by rotating the spring holding ring 109.

How resonance frequencies are matched in the vibrator 101 (piezoelectric element) included in the ultrasonic motor 100 is explained below referring to FIGS. 3A, 3B, and 4.

Figure 3A:
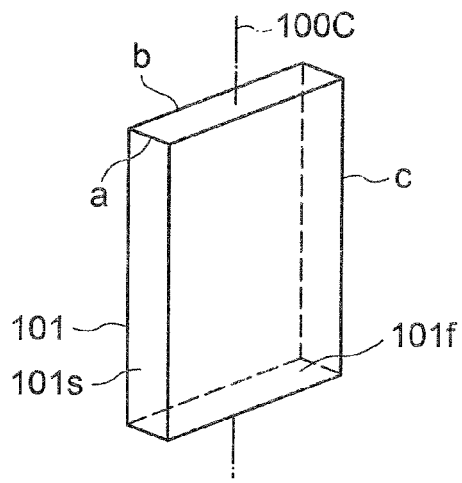
FIG. 3A is a perspective view of a schematic structure of a vibrator according to the first embodiment.
Figure 3B:
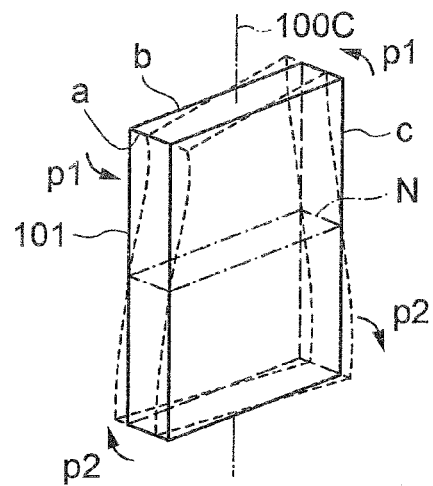
FIG. 3B is a perspective view that depicts with a broken line a vibration state of the vibrator in a torsional primary vibration mode.

As shown in FIG. 3A, the vibrator 101 has a substantially right-angled parallelepiped shape. A length of a short side 101s of a rectangular cross-section that is orthogonal to the central axis 100C is denoted by a, a length of a long side 101f is denoted by b, and a height of the vibrator 101 along the central axis 100C is denoted by c. In the following explanation, a height direction of the vibrator 101 is assumed to be a direction of a vibration in a primary vibration mode as well as an axis direction of torsion in the torsional vibration. Moreover, a, b, and c satisfy a<b<c.

The resonance frequency in the longitudinal primary vibration mode and the resonance frequency in a torsional secondary vibration mode, or the resonance frequency in the longitudinal primary vibration mode and the resonance frequency in a torsional tertiary vibration mode can be matched by appropriately choosing a, b, and c in the vibrator 101.

Figure 3C:
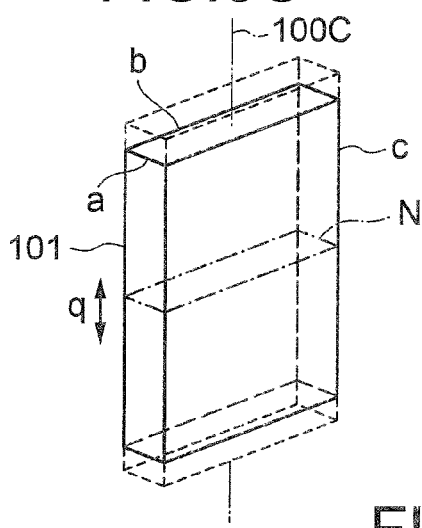
FIG. 3C is a perspective view that depicts with a broken line a vibration state of the vibrator in a longitudinal primary vibration mode.
Figure 3D:
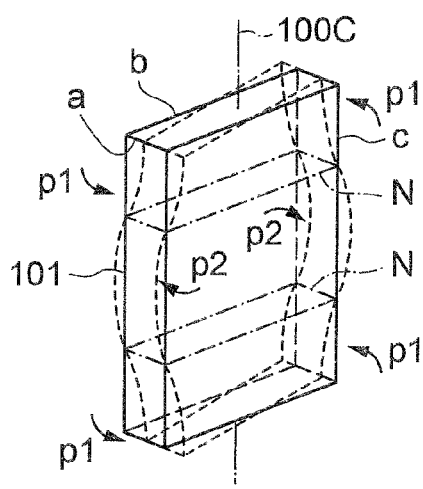
FIG. 3D is a perspective view that depicts with a broken line a vibration state of the vibrator in a torsional secondary vibration mode.
Figure 3E:
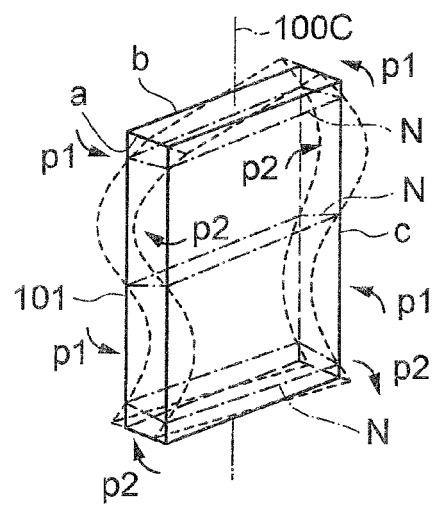
FIG. 3E is a perspective view that depicts with a broken line a vibration state of the vibrator in a torsional tertiary vibration mode.

In FIGS. 3B to 3E, directions of the torsional vibration are shown by p1 and p2, a direction of the longitudinal vibration is shown by q, and a node of the vibration is shown by N. One node N is present at central positions in a height direction in each of a torsional primary vibration mode (FIG. 3B) and the longitudinal primary vibration mode (FIG. 3C). Two nodes N are present at two positions in the height direction in the torsional secondary vibration mode (FIG. 3D). Three nodes N are present at three positions in the height direction in the torsional tertiary vibration mode (FIG. 3E).

In FIGS. 3B to 3E, a continuous line is used to show a shape of the vibrator 101 before it is subjected to vibration and a broken line is used to show a shape of the vibrator 101 after it is subjected to a vibration.

Figure 4:
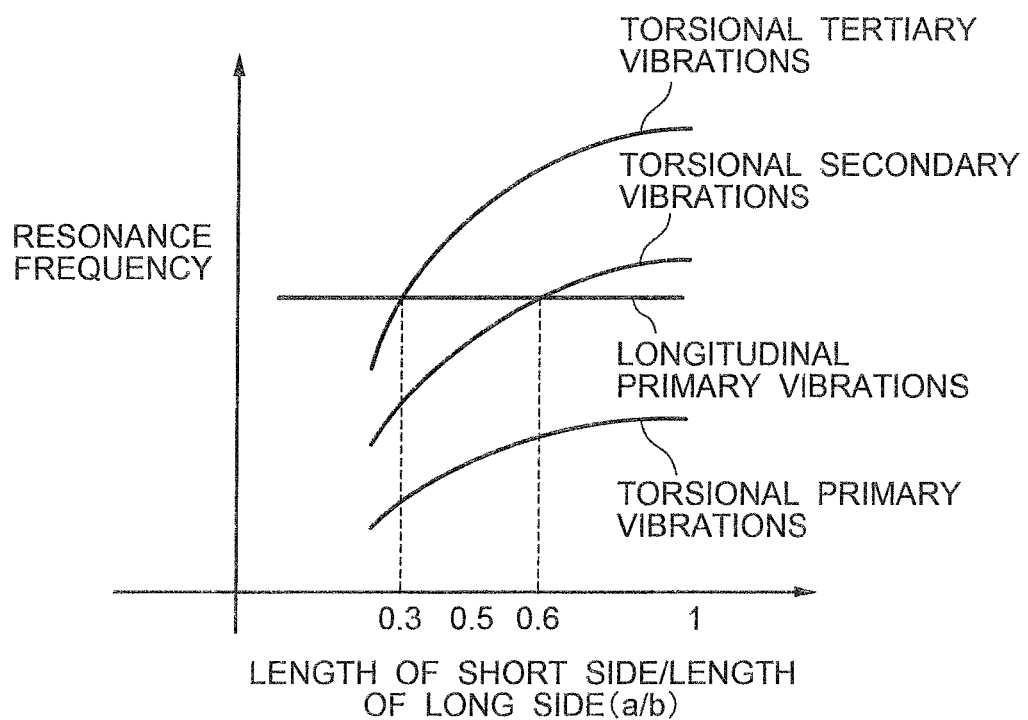
FIG. 4 is a graph that depicts resonance frequencies of each of the modes when a height of the vibrator is fixed and a parameter represented by a length of a short side/a length of a long side is plotted on an axis of abscissa.

As can be seen in FIG. 4, when the parameter a/b is varied, although the resonance frequency of the longitudinal primary vibration mode stays constant without depending on the parameter a/b, the resonance frequencies of the torsional vibration increase with an increase in the parameter a/b.

Furthermore, the resonance frequency of the torsional primary vibration mode never matches with the resonance frequency of the longitudinal primary vibration mode irrespective of the value of the parameter a/b. On the contrary, the resonance frequency of the torsional secondary vibration mode matches with the resonance frequency of the longitudinal primary vibration mode near a position where the parameter a/b is near 0.6. Moreover, the resonance frequency of the torsional tertiary vibration mode matches with the resonance frequency of the longitudinal primary vibration mode near a position where the parameter a/b is near 0.3. Therefore, the lengths a and b are chosen in the vibrator 101 according to the first embodiment such that the parameter a/b falls between 0.25 and 0.35 in the longitudinal primary vibration and the torsional tertiary vibration, and falls between 0.5 and 0.6 in the longitudinal primary vibration and the torsional secondary vibration.

In the ultrasonic motor 100, the elliptical vibration is generated by combining the longitudinal primary resonance vibration, resulting from an expansion and a contraction of the vibrator 101 along the central axis 100C (rotation axis), and the torsional secondary resonance vibration or a torsional tertiary resonance vibration, resulting from twisting of the vibrator 101 around the central axis 100C. A ratio (proportion) of the lengths a and b is chosen such that the resonance frequencies of the longitudinal primary resonance vibration, resulting from the expansion and the contraction of the vibrator 101 along the central axis 100C, and the torsional secondary resonance vibration or the torsional tertiary resonance vibration, resulting from twisting of the vibrator 101 around the central axis 100C, almost match.

The vibrator 101 includes a multilayered piezoelectric element 120 (FIGS. 13 and 14) having a plurality of piezoelectric elements stacked and bonded thereon in a thickness direction (a short side direction of a cross-section orthogonal to the central axis 100C) of the vibrator 101. The longitudinal primary resonance vibration and the torsional secondary resonance vibration are generated in the vibrator 101 according to a deformation of each piezoelectric element. The multilayered piezoelectric element 120 includes a first piezoelectric element 131 and a second piezoelectric element 132 that are piezoelectric elements 130 for torsional vibration, and a third piezoelectric element 141 that is a piezoelectric element 140 for longitudinal vibration. The third piezoelectric element 141 is sandwiched between the first piezoelectric element 131 and the second piezoelectric element 132, and these three piezoelectric elements are stacked in the short side direction of the cross-section orthogonal to the central axis 100C.

The piezoelectric elements and driving electrodes thereof are not shown in FIGS. 1 and 2.

Figure 5:
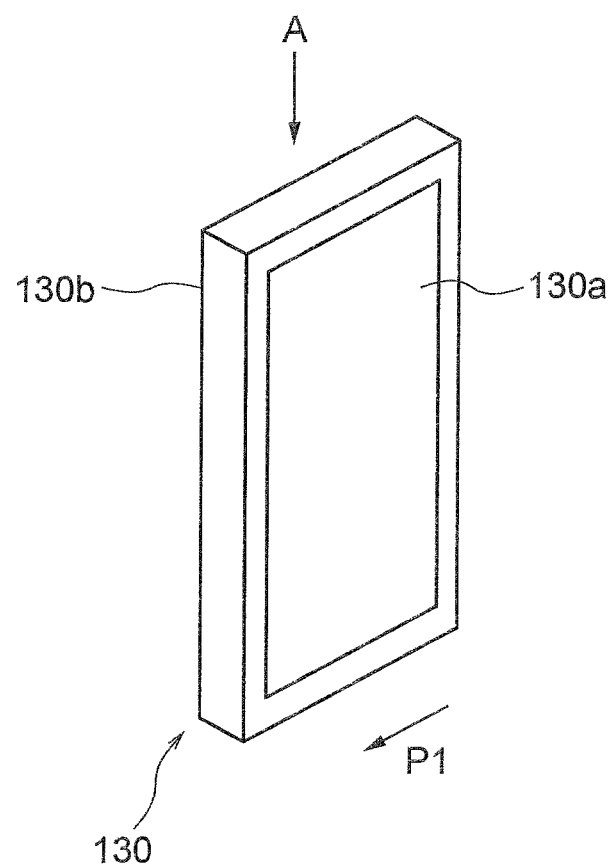
FIG. 5 is a perspective view of a structure of a piezoelectric element for torsional vibration according to the first embodiment.

The piezoelectric element 130 for torsional vibration (torsional piezoelectric body) constituting the multilayered piezoelectric element 120 is explained with reference to FIGS. 5 to 8B. FIG. 5 is a perspective view from an upper front right side of a structure of the piezoelectric element 130 for torsional vibration. FIG. 6A is a perspective view from an upper front right side depicting a thickness shear vibration when a drive signal is applied to the piezoelectric element 130 for torsional vibration. FIG. 6B is a plan view (a view of FIG. 6A from an A direction) of FIG. 6A. FIG. 7A is a perspective view from an upper front right side depicting a thickness shear vibration when a drive signal in a direction opposite to the direction of the case shown in FIGS. 6A and 6B is applied to the piezoelectric element 130 for torsional vibration. FIG. 7B is a plan view (a view of FIG. 7A from the A direction) of FIG. 7A. FIG. 8A is a perspective view depicting a thickness shear vibration when an alternating electric field is applied to the piezoelectric element 130 for torsional vibration. FIG. 8B is a plan view (a view of FIG. 8A from the A direction) of FIG. 8A.

As shown in FIG. 5, the piezoelectric element 130 for torsional vibration is a piezoelectric body of a substantially right-angled parallelepiped shape. In the piezoelectric element 130 for torsional vibration, a first driving electrode 130a and a second driving electrode 130b are, respectively, provided on a front face and a rear face, of the piezoelectric element 130 for torsional vibration, that are facing each other. The first driving electrode 130a and the second driving electrode 130b are connected to an external power supply (not shown) of the ultrasonic motor 100. As an example, an FPC (flexible print circuit) is used for connection and one end of the FPC is connected to each electrode. Thus, the drive signal is applied to the piezoelectric element 130 for torsional vibration via the first driving electrode 130a and the second driving electrode 130b. Accordingly, depending on an electrical polarity of the signal, the drive signal is applied to the driving electrodes in a direction from the first driving electrode 130a to the second driving electrode 130b or in a direction from the second driving electrode 130b to the first driving electrode 130a.

A polarization direction P1 of the piezoelectric element 130 for torsional vibration is orthogonal to the signal application direction towards the driving electrodes, and that is set in a direction that is orthogonal to a vertical direction of the piezoelectric element 130 for torsional vibration. As described later, because the piezoelectric element 130 for torsional vibration is arranged such that the vertical direction thereof orthogonally matches with the central axis 100C of the rotor 102 (FIGS. 1 and 2), the polarization direction P1 of the piezoelectric element 130 for torsional vibration is orthogonal to the signal application direction towards the driving electrodes and orthogonal to the central axis 100C of the rotor 102, and therefore, the external electrode is not formed on the elliptical vibration generating surface 101a.

If a direct current drive signal is applied to the piezoelectric element 130 for torsional vibration having the structure described above, the thickness shear vibration shown in FIGS. 6A and 6B or FIGS. 7A and 7B is generated in the piezoelectric element 130 for torsional vibration. Specifically, as shown in FIGS. 6A and 6B, if a minus side of the external power supply is connected to the first driving electrode 130a and a plus side is connected to the second driving electrode 130b, the front face and the rear face of the piezoelectric element 130 for torsional vibration deform in directions that are parallel to each face but reversed from each other. On the contrary, as shown in FIGS. 7A and 7B, if the plus side of the external power supply is connected to the first driving electrode 130a and the minus side is connected to the second driving electrode 130b, the front face and the rear face of the piezoelectric element 130 for torsional vibration deform in directions opposite to the directions of the case shown in FIGS. 6A and 6B.

When the alternating electric field is applied to the piezoelectric element 130 for torsional vibration, a reciprocating shift deformation occurs due to the thickness shear vibration as shown in FIGS. 8A and 8B.

Consequently, the thickness shear vibration can be generated in the piezoelectric element 130 for torsional vibration according to the signal applied to the first driving electrode 130a and the second driving electrode 130b, producing a shearing deformation in the piezoelectric element 130 for torsional vibration.

Figures 9A, 9B:
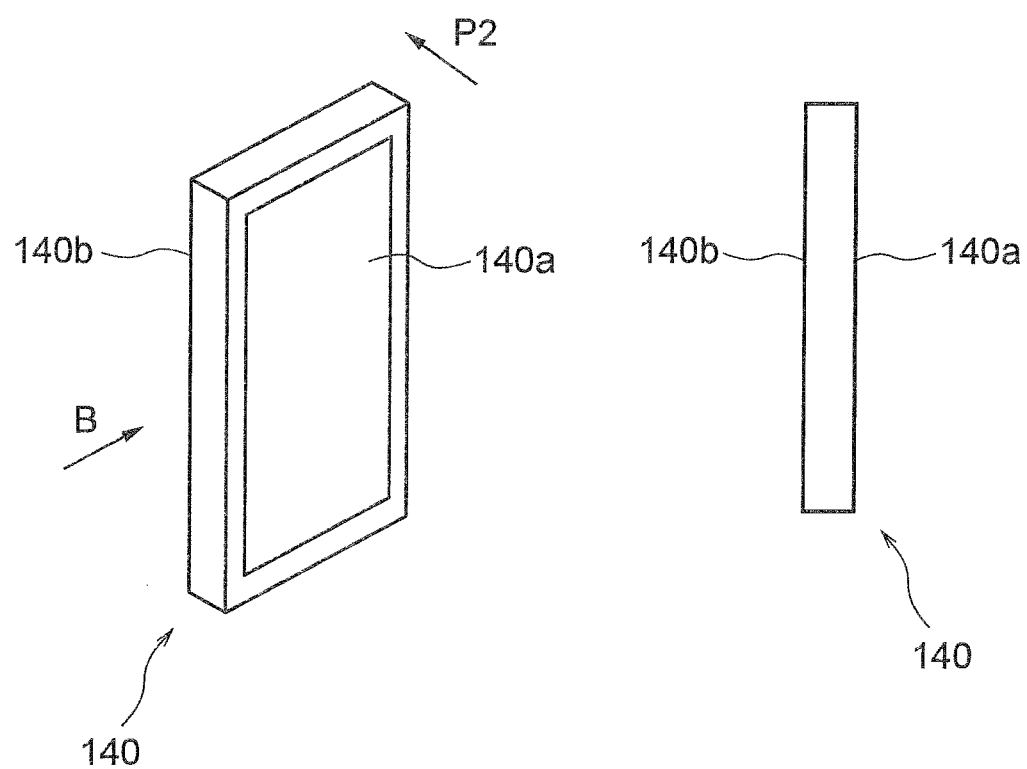
FIG. 9A is a perspective view from an upper front right side of a structure a piezoelectric element for longitudinal vibration according to the first embodiment.
FIG. 9B is a right side view of FIG. 9A.
Figures 10A, 10B:
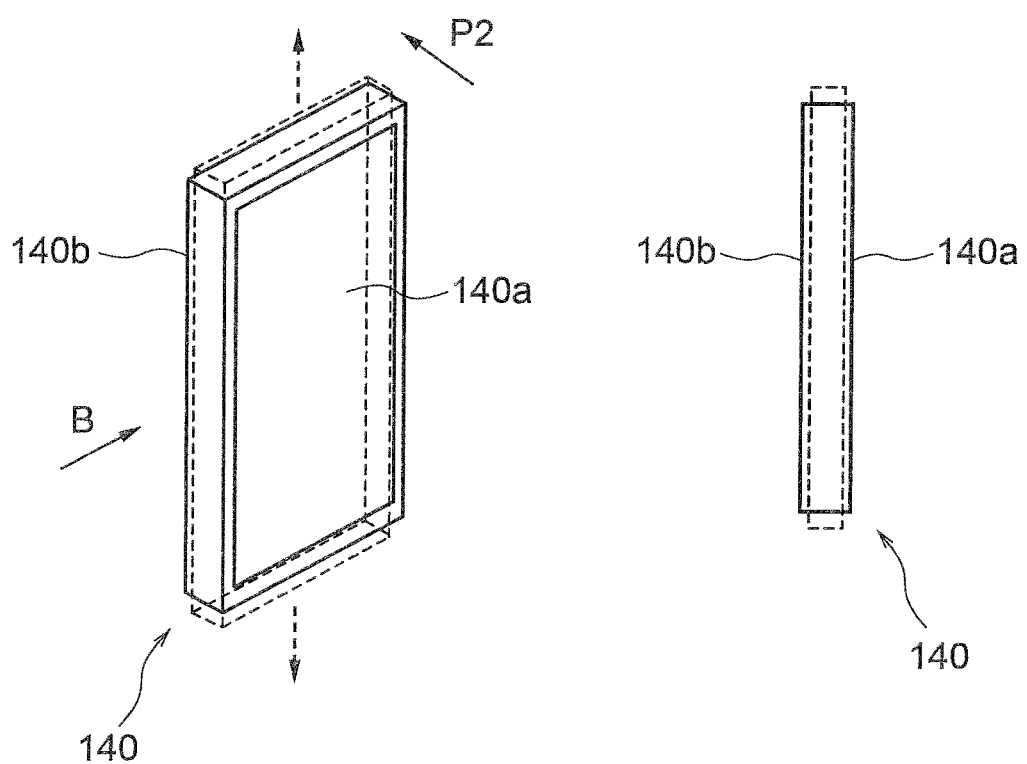
FIG. 10A is a perspective view from an upper front right side depicting a longitudinal vibration when the drive signal is applied to the piezoelectric element for longitudinal vibration.
FIG. 10B is a right side view of FIG. 10A.
Figures 12A, 12B:
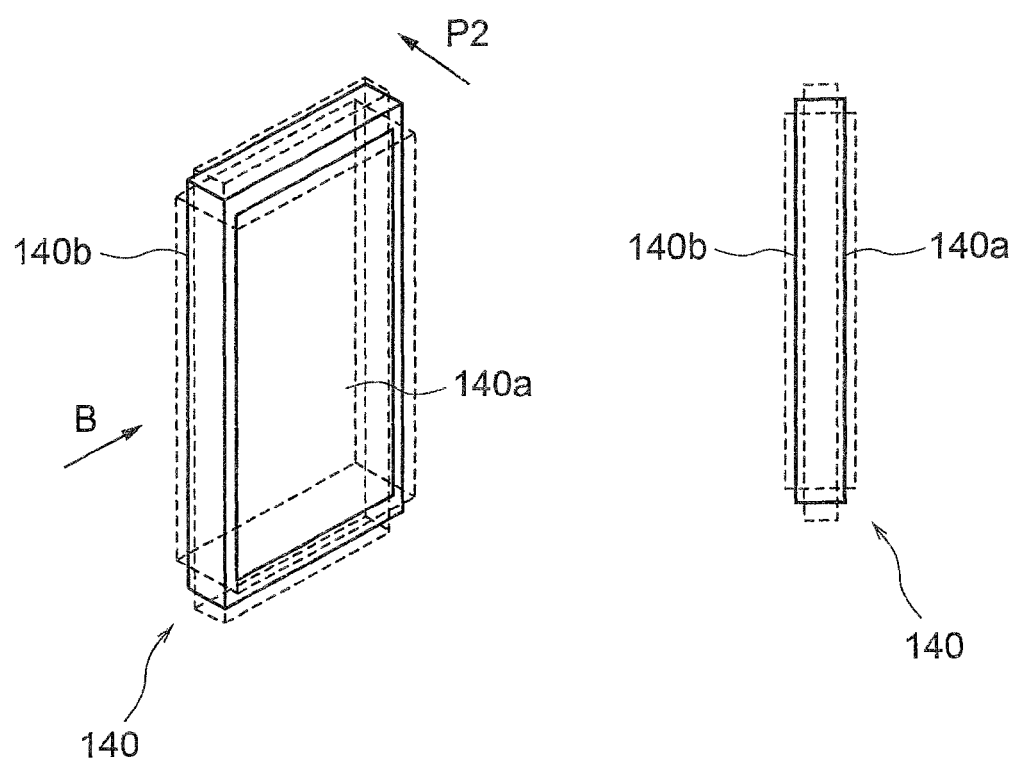
FIG. 12A is a perspective view depicting a longitudinal vibration when an alternating electric field is applied to the piezoelectric element for longitudinal vibration.
FIG. 12B is a right side view of FIG. 12A.
Figure 13:
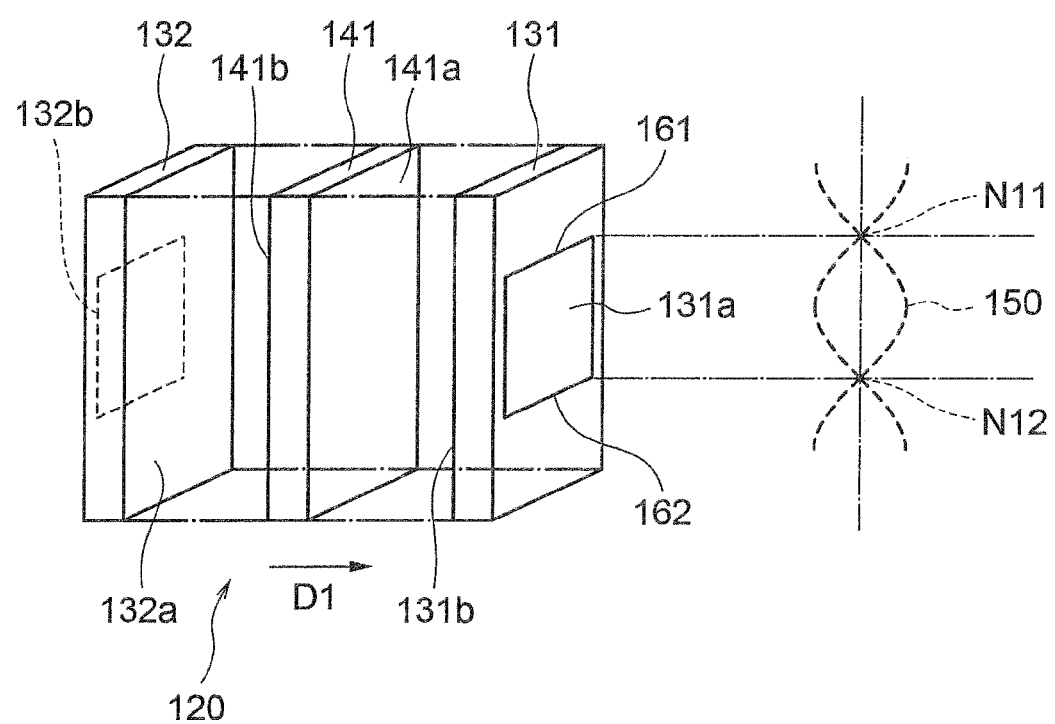
FIG. 13 is an exploded perspective view of a structure of a multilayered piezoelectric element according to the first embodiment, and depicts a side view of a vibration state of the vibrator in a torsional secondary resonance vibration mode shown in FIG. 3D.
Figure 14:
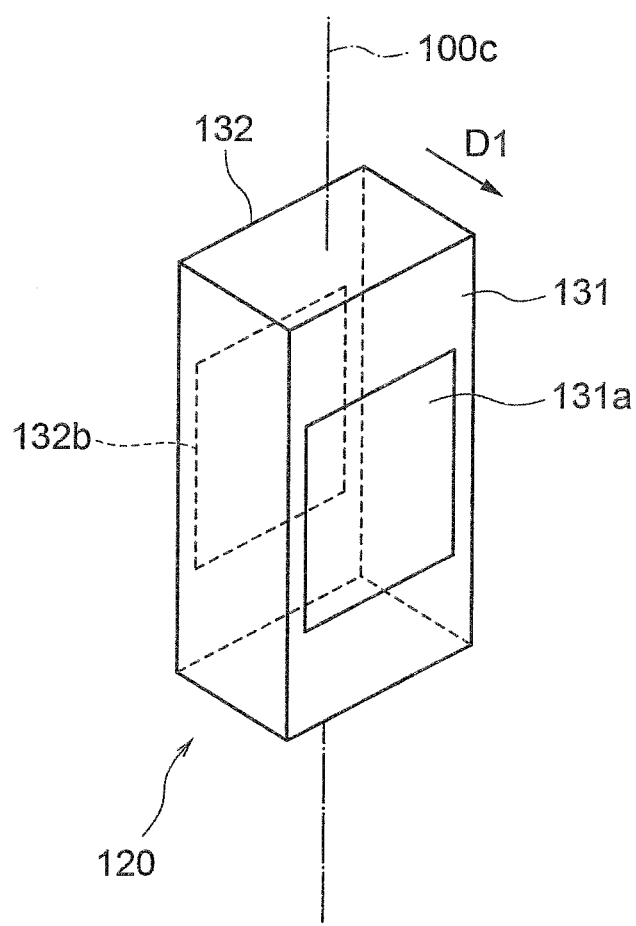
FIG. 14 is a perspective view from an upper front right side of the structure of the multilayered piezoelectric element according to the first embodiment.

The piezoelectric element 140 for longitudinal vibration (piezoelectric body for longitudinal vibration) constituting the multilayered piezoelectric element 120 is explained below with reference to FIGS. 9A to 14. FIG. 9A is a perspective view from an upper front right side of a structure of the piezoelectric element 140 for longitudinal vibration. FIG. 9B is a right side view of FIG. 9A (a view of FIG. 9A from a B direction). FIG. 10A is a perspective view from an upper front right side that depicts a vibration when the drive signal is applied to the piezoelectric element 140 for longitudinal vibration. FIG. 10B is a right side view of FIG. 10A (a view of FIG. 10A from the B direction). FIG. 11A is a perspective view from an upper front right side that depicts the longitudinal vibration when a drive signal in an opposite direction to the direction of the case shown in FIGS. 10A and 10B is applied to the piezoelectric element 140 for longitudinal vibration. FIG. 11B is a right side view of FIG. 11A (a view of FIG. 11A from the B direction). FIG. 12A is a perspective view that depicts the longitudinal vibration when the alternating electric field is applied to the piezoelectric element 140 for longitudinal vibration. FIG. 12B is a right side view of FIG. 12A (a view of FIG. 12A from the B direction). FIG. 13 is an exploded perspective view of a structure of the multilayered piezoelectric element 120, and depicts a side view of a vibration state of a vibrator in the torsional secondary resonance mode shown in FIG. 3D. FIG. 14 is a perspective view from an upper front right side of the structure of the multilayered piezoelectric element 120.

As shown in FIGS. 9A and 9B, the piezoelectric element 140 for longitudinal vibration is a piezoelectric body of a substantially right-angled parallelepiped shape. In the piezoelectric element 140 for longitudinal vibration, a first driving electrode 140a and a second driving electrode 140b are, respectively, provided on a front face and a rear face, of the piezoelectric element 140 for longitudinal vibration, that are facing each other. The first driving electrode 140a and the second driving electrode 140b are connected to the external power supply (not shown) of the ultrasonic motor 100. As an example, the FPC is used for connection and one end of the FPC is connected to each electrode. Thus, the drive signal is applied to the piezoelectric element 140 for longitudinal vibration via the first driving electrode 140a and the second driving electrode 140b. Accordingly, depending on an electrical polarity of the signal, the drive signal is applied to the driving electrodes in a direction from the first driving electrode 140a to the second driving electrode 140b or in a direction from the second driving electrode 140b to the first driving electrode 140a.

A polarization direction P2 of the piezoelectric element 140 for longitudinal vibration is a direction along a signal application direction towards the driving electrodes. As described later, the piezoelectric element 140 for longitudinal vibration is arranged such that a vertical direction thereof orthogonally matches with the central axis 100C of the rotor 102 (FIGS. 1 and 2). Therefore, the polarization direction P2 of the piezoelectric element 140 for longitudinal vibration is along the signal application direction towards the driving electrodes, and orthogonal to the central axis 100C of the rotor 102, and therefore, the external electrode is not formed on the elliptical vibration generating surface 101a.

If the drive signal is applied to the piezoelectric element 140 for longitudinal vibration having the structure described above, the longitudinal vibration is generated in the piezoelectric element 140 for longitudinal vibration as shown in FIGS. 10A and 10B or FIGS. 11A and 11B. Specifically, if one of the minus and plus sides of the external power supply is connected to the first driving electrode 140a and the other side is connected to the second driving electrode 140b, the piezoelectric element 140 for longitudinal vibration expands in a vertical direction (vertical direction shown in FIGS. 9A to 11B) as shown in FIGS. 10A and 10B. If the connection to the first driving electrode 140a and the second driving electrode 140b is interchanged, the piezoelectric element 140 for longitudinal vibration contracts in the vertical direction (FIGS. 11A and 11B).

When the alternating electric field is applied to the piezoelectric element 140 for longitudinal vibration, reciprocating longitudinal deformation occurs due to the longitudinal vibration as shown in FIGS. 12A and 12B.

Thus, the piezoelectric element 140 for longitudinal vibration longitudinally vibrates in response to the signal applied to the first driving electrode 140a and the second driving electrode 140b.

A case in which the torsional secondary resonance vibration is generated is explained below with reference to FIGS. 13 and 14. The multilayered piezoelectric element 120 includes, stacked in an order along a thickness direction D1, the first piezoelectric element 131, the third piezoelectric element 141, and the second piezoelectric element 132.

The first piezoelectric element 131 and the second piezoelectric element 132 have the same structure as that of the piezoelectric element 130 for torsional vibration shown in FIGS. 5 to 8B. The shape of the first piezoelectric element 131 and the second piezoelectric element 132 is also the same. A first driving electrode 131a and a second driving electrode 131b of the first piezoelectric element 131, respectively, correspond to the first driving electrode 130a and the second driving electrode 130b of the piezoelectric element 130 for torsional vibration. A first driving electrode 132a and a second driving electrode 132b of the second piezoelectric element 132, respectively, correspond to the first driving electrode 130a and the second driving electrode 130b of the piezoelectric element 130 for torsional vibration.

The second driving electrode 131b and the first driving electrode 132a are whole-surface electrodes. After stacking of the first piezoelectric element 131, the third piezoelectric element 141, and the second piezoelectric element 132 is completed, the second driving electrode 131b and the first driving electrode 132a, respectively, face a first driving electrode 141a and a second driving electrode 141b of the third piezoelectric element 141. After stacking of the first piezoelectric element 131, the third piezoelectric element 141, and the second piezoelectric element 132 is completed, the first driving electrode 131a and the second driving electrode 132b are arranged at mutually corresponding positions.

The third piezoelectric element 141 has the same structure as that of the piezoelectric element 140 for longitudinal vibration shown in FIGS. 9A to 12B. An outer shape of the third piezoelectric element 141 is the same as that of the first piezoelectric element 131 and the second piezoelectric element 132. The first driving electrode 141a and the second driving electrode 141b, respectively, correspond to the first driving electrode 140a and the second driving electrode 140b of the piezoelectric element 140 for longitudinal vibration. The first driving electrode 141a and the second driving electrode 141b are whole-surface electrodes.

The concept behind the structure of the multilayered piezoelectric element 120 described so far is explained below. In the multilayered piezoelectric element 120, a short side and a long side are configured so as to satisfy the condition that generates the torsional secondary resonance vibration, as shown in FIG. 4. As a result, the torsional secondary resonance vibration shown on the right side in FIG. 13 is generated. A wavy line indicates a vibration state of a torsional secondary resonance vibration 150 that is shown on the right side in FIG. 13. The first driving electrode 131a of the first piezoelectric element 131 and the second driving electrode 132b of the second piezoelectric element 132 are arranged such that they correspond to positions of nodes and anti-nodes of a vibration state of the torsional secondary resonance vibration 150.

Specifically, as shown in FIG. 13, upper ends of the first driving electrode 131a of the first piezoelectric element 131 and the second driving electrode 132b of the second piezoelectric element 132 are arranged so as to correspond to a node N11 of the torsional secondary resonance vibration 150, and lower ends of the first driving electrode 131a of the first piezoelectric element 131 and the second driving electrode 132b of the second piezoelectric element 132 are arranged so as to correspond to a node N12 of the torsional secondary resonance vibration 150. Thus, the first driving electrode 131a and the second driving electrode 132b that cause generation of the torsional secondary resonance vibration are arranged so as to correspond to the anti-node of the torsional secondary resonance vibration 150. With this structure, maximum torsional stress is realized at the torsion node positions. Thus, the torsional secondary resonance vibration is efficiently excited.

Drive signals of reverse phases are applied to the first piezoelectric element 131 and the second piezoelectric element 132 so that the signal application direction is reversed. Thus, the torsional secondary resonance vibration (FIG. 3D) resulting from twisting of the vibrator 101 about the central axis 100C is generated. Moreover, an elliptical vibration is generated on each end faces in the height direction of the vibrator 101 by combining the torsional secondary resonance vibration and the longitudinal primary resonance vibration (FIG. 3C) generated due to deformation of the third piezoelectric element 141. Accordingly, the elliptical vibration is propagated to the rotor 102 through the friction contact members 103a and 103b.

With this structure, the vibrator 101 that has a simple structure, that is made of a single member, and that does not require a groove, etc., can be realized. The cost of the ultrasonic motor 100 that includes the vibrator 101 can be reduced because it requires only a small number of parts and can be easily assembled. Furthermore, the ultrasonic motor 100 can easily generate the longitudinal vibration and the torsional vibration, and rotate the rotor 102 with the elliptical vibration that is formed by combining the longitudinal vibration and the torsional vibration.

The first driving electrode 131a and the second driving electrode 131b have the same planar shape. In the multilayered piezoelectric element 120, the first driving electrode 131a and the second driving electrode 131b can be arranged at different corresponding positions, in different areas, and in different shapes than those shown in FIGS. 13 and 14. For example, one of the upper and lower ends or both can be arranged more inward than the nodes N11 and N12 of the torsional secondary resonance vibration 150.

The electrode can be removed from the second driving electrode 131b, the first driving electrode 141a, the second driving electrode 141b, and the first driving electrode 132a, for example, by applying silver paste on top and bottom surfaces of the multilayered piezoelectric element 120.

Second Embodiment

In an ultrasonic motor according to a second embodiment of the present invention, a structure of a multilayered piezoelectric element 220 used in the vibrator 101 differs from that of the multilayered piezoelectric element 120 according to the first embodiment. A structure of the ultrasonic motor according to the second embodiment is the same as that of the ultrasonic motor 100 according to the first embodiment except for the multilayered piezoelectric element 220. The same reference symbols are used for the same members and description of the members other than the multilayered piezoelectric element 220 is omitted.

Figure 15:
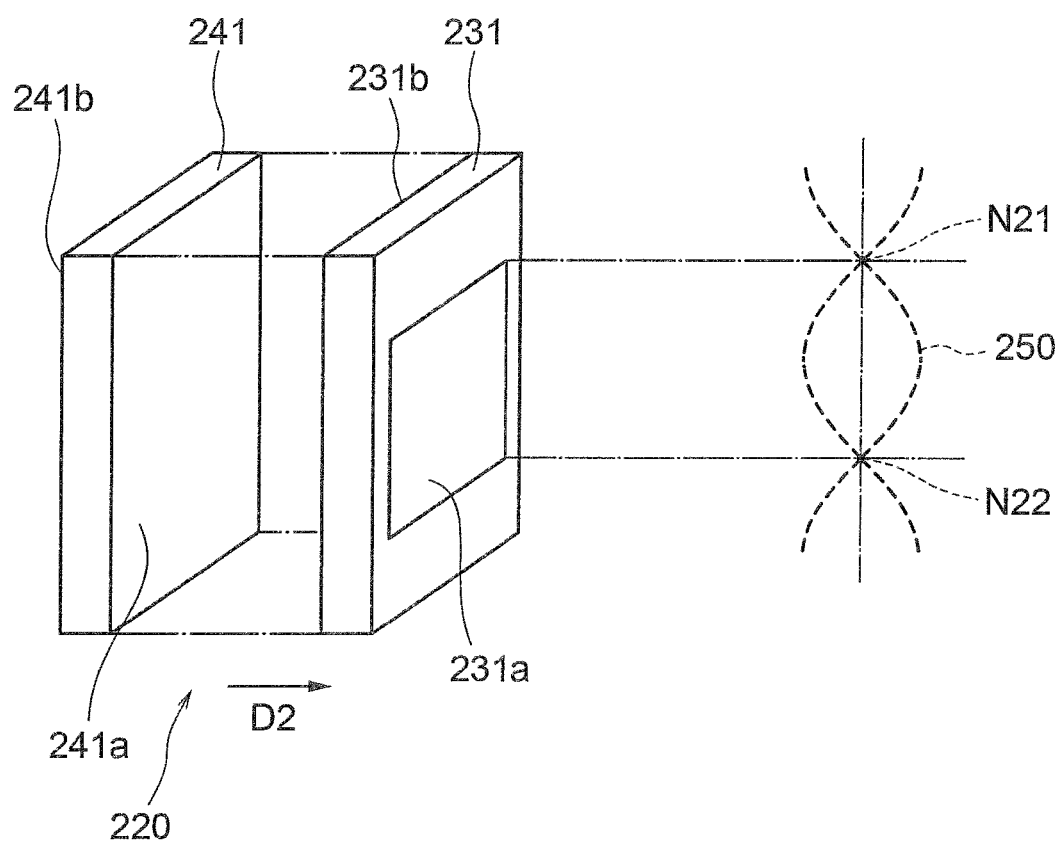
FIG. 15 is an exploded perspective view of a structure of a multilayered piezoelectric element according to a second embodiment of the present invention, and depicts a side view of a vibration state of the vibrator in the torsional secondary resonance vibration mode shown in FIG. 3D.
Figure 16:
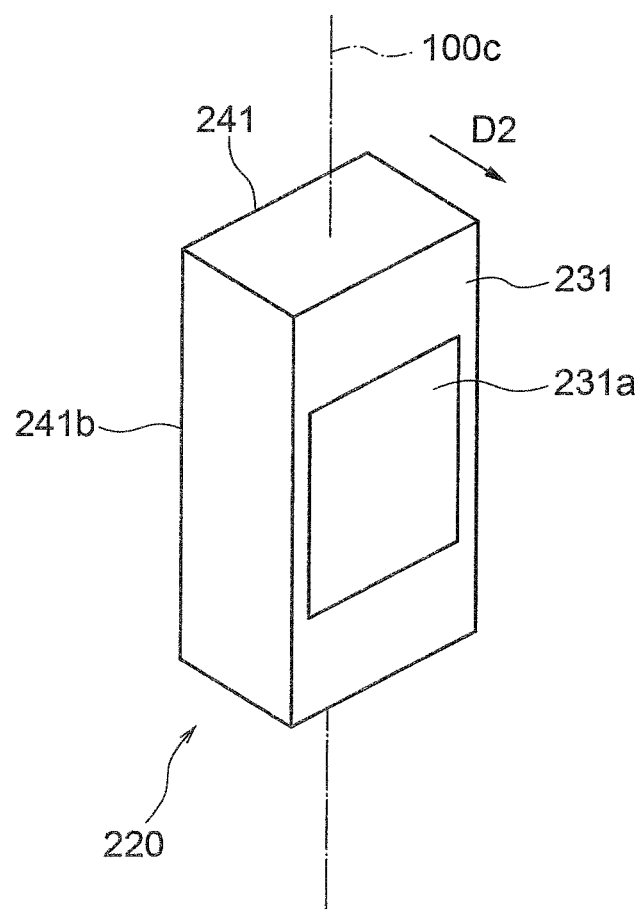
FIG. 16 is a perspective view from an upper front right side of a structure of a multilayered piezoelectric element according to a second embodiment of the present invention.

FIG. 15 is an exploded perspective view of the structure of the multilayered piezoelectric element 220, and depicts a side view of the vibration state of the vibrator 101 in the torsional secondary resonance mode shown in FIG. 3D. FIG. 16 is a perspective view from an upper front right side of the structure of the multilayered piezoelectric element 220.

As shown in FIGS. 15 and 16, the multilayered piezoelectric element 220 includes, stacked in an order along a thickness direction D2, a first piezoelectric element 231 and a second piezoelectric element 241.

The first piezoelectric element 231 has the same structure as that of the piezoelectric element 130 for torsional vibration shown in FIGS. 5 to 8B. A first driving electrode 231a and a second driving electrode 231b of the first piezoelectric element 231, respectively, correspond to the first driving electrode 130a and the second driving electrode 130b of the piezoelectric element 130 for torsional vibration.

The second piezoelectric element 241 has the same structure as that of the piezoelectric element 140 for longitudinal vibration shown in FIGS. 9A to 12B. A first driving electrode 241a and a second driving electrode 241b of the second piezoelectric element 241, respectively, correspond to the first driving electrode 140a and the second driving electrode 140b of the piezoelectric element 140 for longitudinal vibration.

The concept behind the structure of the multilayered piezoelectric element 220 described so far is explained below. In the multilayered piezoelectric element 220, a short side and a long side are configured so as to satisfy the condition that generates the torsional secondary resonance vibration, as shown in FIG. 4. As a result, the torsional secondary resonance vibration, shown on the right side in FIG. 15, is generated. A wavy line indicates a vibration state of a torsional secondary resonance vibration 250 shown on the right side in FIG. 15. The first driving electrode 231a of the first piezoelectric element 231 is arranged such that it corresponds to a position of nodes and anti-nodes of the vibration state of the torsional secondary resonance vibration 250.

Specifically, as shown in FIG. 15, an upper end of the first driving electrode 231a of the first piezoelectric element 231 is arranged so as to correspond to a node N21 of the torsional secondary resonance vibration 250, and a lower end of the first driving electrode 231a of the first piezoelectric element 231 is arranged so as to correspond to a node N22 of the torsional secondary resonance vibration 250. Thus, the first driving electrode 231a is arranged so as to correspond to the anti-node of the torsional secondary resonance vibration 250.

With this structure, maximum torsional stress is realized at the torsion node positions. Thus, the torsional secondary resonance vibration is efficiently excited.

The ultrasonic motor 100 according to the first embodiment includes the two piezoelectric elements 131 and 132 for torsional vibration with the third piezoelectric element 141 for longitudinal vibration arranged therebetween, while the ultrasonic motor according to the second embodiment includes the first piezoelectric element 231 for torsional vibration and the second piezoelectric element 241 making a two-layered structure. Thus, the torsional secondary resonance vibration similar to that of the first embodiment can be generated even if there is one piezoelectric element for torsional vibration that generates the torsional secondary resonance vibration.

When the drive signal is applied to the first piezoelectric element 231, the torsional secondary resonance vibration resulting from twisting of the vibrator 101 about the central axis 100C is generated (FIG. 3D) Furthermore, the elliptical vibration is generated on each end faces in the height direction of the vibrator 101 by combining the torsional secondary resonance vibration and the longitudinal primary resonance vibration generated due to deformation of the second piezoelectric element 241 (FIG. 30). Thus, the elliptical vibration is propagated to the rotor 102 through the friction contact members 103a and 103b.

Other structures, operations, advantages, and modifications are the same as those of the first embodiment.

Third Embodiment

In an ultrasonic motor according to a third embodiment of the present invention, a structure of a multilayered piezoelectric element 320 used in the vibrator 101 differs from that of the multilayered piezoelectric element 120 according to the first embodiment, and a torsional resonance vibration that is generated is a torsional tertiary resonance vibration. A structure of the ultrasonic motor according to the third embodiment is the same as that of the ultrasonic motor 100 according to the first embodiment except for the multilayered piezoelectric element 320. The same reference symbols are used for the same members and description of the members other than the multilayered piezoelectric element 320 is omitted.

Figure 17:
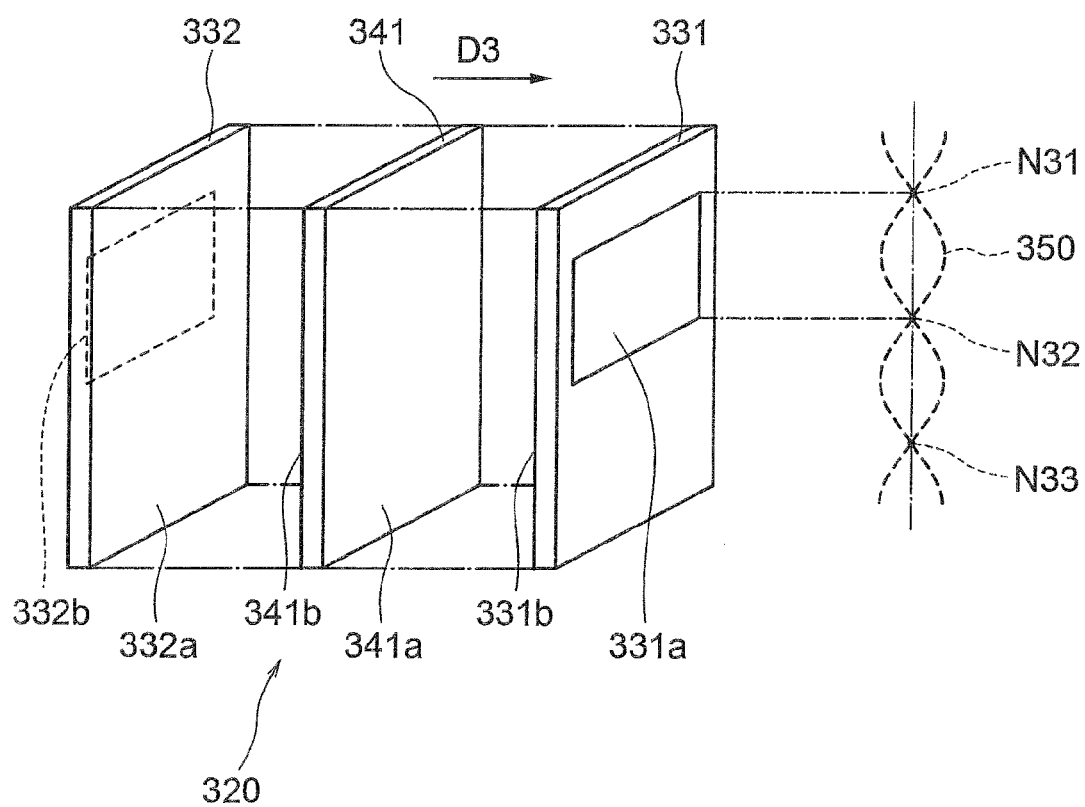
FIG. 17 is an exploded perspective view of a structure of a multilayered piezoelectric element according to a third embodiment of the present invention, and depicts a side view of a vibration state of the vibrator in the torsional tertiary resonance vibration mode shown in FIG. 3E.
Figure 18:
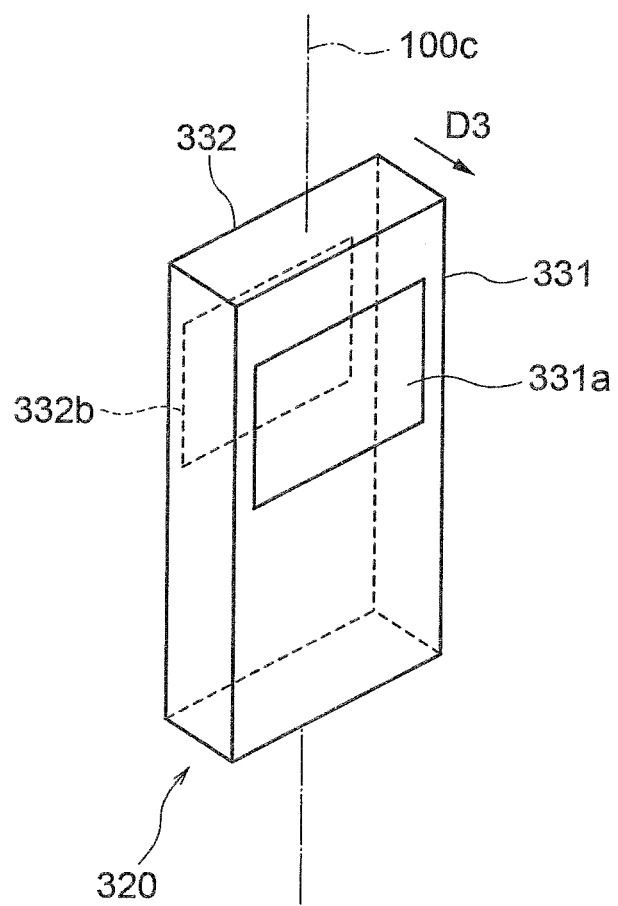
FIG. 18 is a perspective view from an upper front right side of the structure of the multilayered piezoelectric element according to the third embodiment.

FIG. 17 is an exploded perspective view of the structure of the multilayered piezoelectric element 320, and depicts a side view of the vibration state of the vibrator 101 in the torsional tertiary resonance vibration shown in FIG. 3E. FIG. 18 is a perspective view from an upper front right side of the structure of the multilayered piezoelectric element 320.

As shown in FIGS. 17 and 18, the multilayered piezoelectric element 320 includes, stacked in an order along a thickness direction D3, a first piezoelectric element 331, a third piezoelectric element 341, and a second piezoelectric element 332.

The first piezoelectric element 331 and the second piezoelectric element 332 have the same structure as that of the piezoelectric element 130 for torsional vibration shown in FIGS. 5 to 8B. A first driving electrode 331a and a second driving electrode 331b of the first piezoelectric element 331, respectively, correspond to the first driving electrode 130a and the second driving electrode 130b of the piezoelectric element 130 for torsional vibration. A first driving electrode 332a and a second driving electrode 332b of the second piezoelectric element 332, respectively, correspond to the first driving electrode 130a and the second driving electrode 130b of the piezoelectric element 130 for torsional vibration.

The third piezoelectric element 341 has the same structure as that of the piezoelectric element 140 for longitudinal vibration shown in FIGS. 9A to 12B. A first driving electrode 341a and a second driving electrode 341b of the third piezoelectric element 341, respectively, correspond to the first driving electrode 140a and the second driving electrode 140b of the piezoelectric element 140 for longitudinal vibration.

The concept behind the structure of the multilayered piezoelectric element 320 described so far is explained below. In the multilayered piezoelectric element 320, a short side and a long side are configured so as to satisfy the condition that generates the torsional tertiary resonance vibration (nodes N31, N32, and N33), as shown in FIG. 4. As a result, the torsional tertiary resonance vibration shown on the right side in FIG. 17 are generated. A wavy line indicates a vibration state of a torsional tertiary resonance vibration 350 shown on the right side in FIG. 17. The first driving electrode 331a of the first piezoelectric element 331 and the second driving electrode 332b of the second piezoelectric element 332 are arranged such that they correspond to positions of nodes and anti-nodes of the vibration state of the torsional tertiary resonance vibration 350.

Specifically, as shown in FIG. 17, upper ends of the first driving electrode 331a of the first piezoelectric element 331 and the second driving electrode 332b of the second piezoelectric element 332 are arranged so as to correspond to the node N31, and lower ends of the first driving electrode 331a of the first piezoelectric element 331 and the second driving electrode 332b of the second piezoelectric element 332 are arranged so as to correspond to the node N32. Thus, the first driving electrode 331a and the second driving electrode 332b are arranged so as to correspond to the anti-node of the torsional tertiary resonance vibration 350.

With this structure, maximum torsional stress is realized at the torsion node positions. Thus, the torsional tertiary resonance vibration is efficiently excited.

When the drive signals of the reverse phases are applied to the first piezoelectric element 331 and the second piezoelectric element 332 so that the signal application direction is reversed, the torsional tertiary resonance vibration resulting from twisting of the vibrator 101 about the central axis 100C is generated (FIG. 3E). Furthermore, the elliptical vibration is generated on both the end faces in the height direction of the vibrator 101 by combining the torsional tertiary resonance vibration and the longitudinal primary resonance vibration generated due to deformation of the third piezoelectric element 341 (FIG. 3C). Thus, the elliptical vibration is propagated to the rotor 102 through the friction contact members 103a and 103b.

Other structures, operations, advantages, and modifications are the same as those of the first embodiment.

Fourth Embodiment

In an ultrasonic motor according to a fourth embodiment of the present invention, a structure of a multilayered piezoelectric element 420 used in the vibrator 101 differs from that of the multilayered piezoelectric element 120 according to the first embodiment. A structure of the ultrasonic motor according to the fourth embodiment is the same as that of the ultrasonic motor 100 according to the first embodiment except for the multilayered piezoelectric element 420. The same reference symbols are used for the same members and description of the members other than the multilayered piezoelectric element 420 is omitted.

Figure 19:
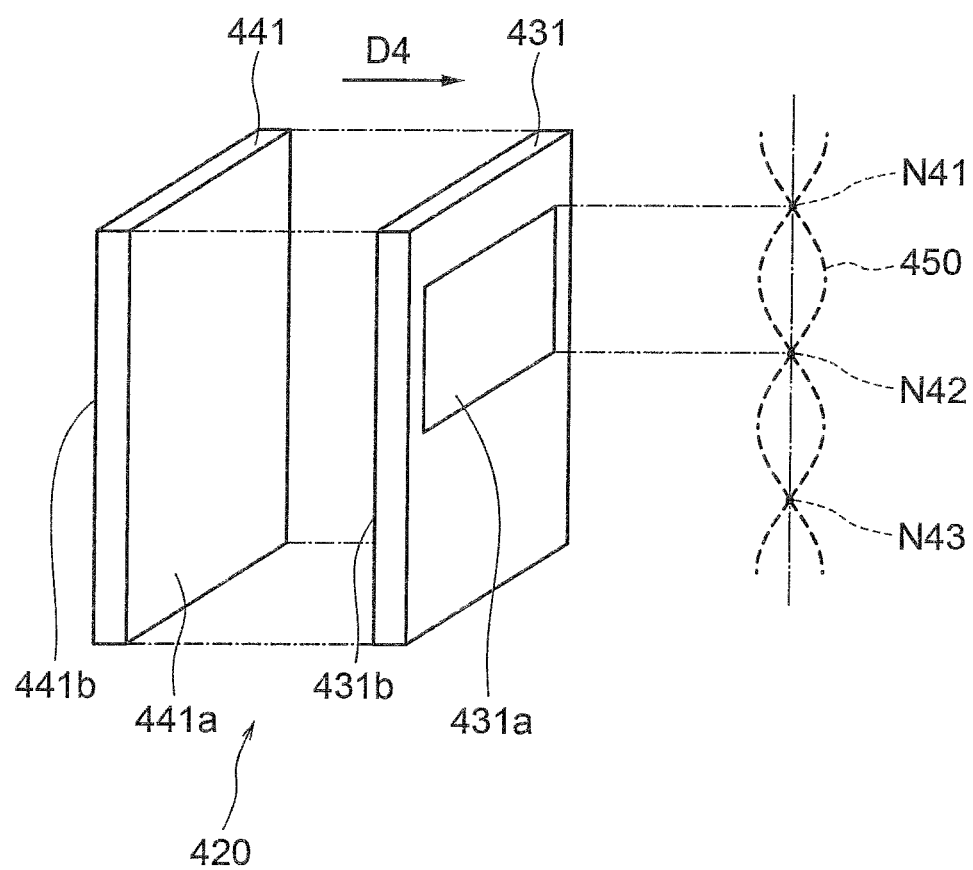
FIG. 19 is an exploded perspective view of a structure of a multilayered piezoelectric element according to a fourth embodiment of the present invention, and depicts a side view of a vibration state of the vibrator in the torsional tertiary resonance vibration mode shown in FIG. 3E.
Figure 20:
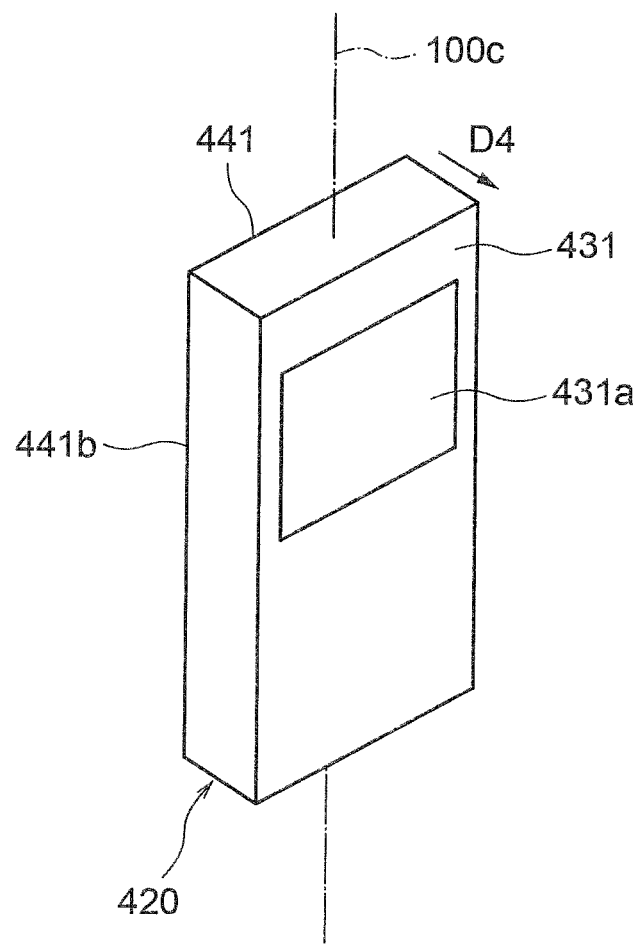
FIG. 20 is a perspective view from an upper front right side of the structure of the multilayered piezoelectric element according to the fourth embodiment.

FIG. 19 is an exploded perspective view of the structure of the multilayered piezoelectric element 420, and depicts a side view of the vibration state of the vibrator 101 in the torsional tertiary resonance vibration shown in FIG. 3E, FIG. 20 is a perspective view from an upper front right side of the structure of the multilayered piezoelectric element 420.

As shown in FIGS. 19 and 20, the multilayered piezoelectric element 420 includes, stacked in an order along a thickness direction D4, a first piezoelectric element 431 and a second piezoelectric element 441.

The first piezoelectric element 431 has the same structure as that of the piezoelectric element 130 for torsional vibration shown in FIGS. 5 to 8B. A first driving electrode 431a and a second driving electrode 431b of the first piezoelectric element 431, respectively, correspond to the first driving electrode 130a and the second driving electrode 130b of the piezoelectric element 130 for torsional vibration.

The second piezoelectric element 441 has the same structure as that of the piezoelectric element 140 for longitudinal vibration shown in FIGS. 9A to 12B. A first driving electrode 441a and a second driving electrode 441b, respectively, correspond to the first driving electrode 140a and the second driving electrode 140b of the piezoelectric element 140 for longitudinal vibration.

The concept behind the structure of the multilayered piezoelectric element 420 described so far is explained below. In the multilayered piezoelectric element 420, a short side and a long side are configured so as to satisfy the condition that generates the torsional tertiary resonance vibration (nodes N41, N42, and N43), as shown in FIG. 4. As a result, the torsional tertiary resonance vibration, shown on the right side in FIG. 19, is generated. A wavy line indicates a vibration state of a torsional tertiary resonance vibration 450 shown on the right side in FIG. 19. The first driving electrode 431a of the first piezoelectric element 431 is arranged such that it corresponds to positions of nodes and anti-nodes of the vibration state of the torsional tertiary resonance vibration 450.

Specifically, as shown in FIG. 19, an upper end of the first driving electrode 431a of the first piezoelectric element 431 is arranged so as to correspond to the node N41 of the torsional tertiary resonance vibration 450, and a lower end of the first driving electrode 431a of the first piezoelectric element 431 is arranged so as to correspond to the node N42 of the torsional tertiary resonance vibration 450. Thus, the first driving electrode 431a is arranged so as to correspond to the anti-node of the torsional tertiary resonance vibration 450.

With this structure, maximum torsional stress is realized at the torsion node positions. Thus, the torsional tertiary resonance vibration is efficiently excited.

The ultrasonic motor according to the third embodiment includes the first piezoelectric element 331 and the second piezoelectric element 332 for torsional vibration with the third piezoelectric element 341 for longitudinal vibration arranged therebetween, while the ultrasonic motor according to the fourth embodiment includes the first piezoelectric element 431 for torsional vibration and the second piezoelectric element 441 making a two-layered structure. Thus, the torsional tertiary resonance vibration similar to that of the third embodiment can be generated even if there is one piezoelectric element for torsional vibration that generates the torsional tertiary resonance vibration.

When the drive signal is applied to the first piezoelectric element 431, the torsional tertiary resonance vibration resulting from twisting of the vibrator 101 about the central axis 100C is generated (FIG. 3E). Furthermore, the elliptical vibration is generated on both the end faces in the height direction of the vibrator 101 by combining the torsional tertiary resonance vibration and the longitudinal primary resonance vibration generated due to deformation of the second piezoelectric element 441 (FIG. 3C). Thus, the elliptical vibration is propagated to the rotor 102 through the friction contact members 103a and 103b.

As explained above, the ultrasonic motor according to the present invention is appropriate for the ultrasonic motor that rotates the rotor by generating the elliptical vibration by combining the longitudinal vibration and the torsional vibration.

The ultrasonic motor according to the present invention can generate the torsional resonance vibration efficiently by positively applying a shear vibration of the piezoelectric element. Moreover, the ultrasonic motor according to the present invention is made of a single member, has a simple structure without a groove etc., can generate the longitudinal vibration and the torsional vibration easily, can generate the elliptical vibration by combining the longitudinal vibration and the torsional vibration, and can rotate the rotor by the elliptical vibration.

What is claimed is:

1. An ultrasonic motor at least comprising:
a vibrator having a dimension ratio of a rectangle in a cross-section orthogonal to a central axis; and
a rotor that is in contact with an elliptical vibration generating surface of the vibrator and that is rotated around the central axis, which is orthogonal to the elliptical vibration generating surface of the vibrator,
wherein an elliptical vibration is generated by combining a longitudinal primary resonance vibration resulting from an expansion and a contraction of the vibrator in a direction of the central axis and a torsional secondary resonance vibration or a torsional tertiary resonance vibration resulting from twisting of the vibrator about the central axis,
the dimension ratio of the rectangle of the vibrator is chosen such that a resonance frequency of the longitudinal primary resonance vibration resulting from the expansion and the contraction of the vibrator in the direction of the central axis and a resonance frequency of the torsional secondary resonance vibration or the torsional tertiary resonance vibration resulting from twisting of the vibrator about the central axis substantially match, and
the vibrator includes, stacked in a short side direction of the cross-section, at least one torsional piezoelectric body that generates the torsional secondary resonance vibration or the torsional tertiary resonance vibration, and a piezoelectric body for longitudinal vibration that generates at least a longitudinal primary resonance vibration.

2. The ultrasonic motor according to claim 1, wherein an electrode that generates in the torsional piezoelectric body the torsional secondary resonance vibration or the torsional tertiary resonance vibration is arranged at an anti-node position of the torsional secondary resonance vibration or the torsional tertiary resonance vibration.

3. The ultrasonic motor according to claim 2, wherein a polarization direction of the torsional piezoelectric body is orthogonal to the central axis of the rotor and a signal application direction towards driving electrodes.

4. The ultrasonic motor according to claim 3, wherein the vibrator includes one torsional piezoelectric body and one piezoelectric body for longitudinal vibration that are stacked in the short side direction of the cross-section.

5. The ultrasonic motor according to claim 3, wherein the vibrator includes two torsional piezoelectric bodies with one piezoelectric body for longitudinal vibration sandwiched therebetween.

6. The ultrasonic motor according to claim 1, wherein a polarization direction of the torsional piezoelectric body is orthogonal to the central axis of the rotor and a signal application direction towards driving electrodes.

7. The ultrasonic motor according to claim 1, wherein the vibrator includes one torsional piezoelectric body and one piezoelectric body for longitudinal vibration that are stacked in the short side direction of the cross-section.

8. The ultrasonic motor according to claim 1, wherein the vibrator includes two torsional piezoelectric bodies with one piezoelectric body for longitudinal vibration sandwiched therebetween.

* * * * *